United States Patent Office 3,600,316
Patented Aug. 17, 1971

3,600,316
METHOD OF PRODUCING A DESCALING COMPOSITION FROM SODIUM HYDROXIDE, SODIUM AND HYDROGEN UNDER PRESSURE
Jiri Mostecky, Prague, Milan Stanek, Frydek-Mistek, Zdenek Koudela, Novy Bohumin, and Eva Schierova, Ostrava-Poruba, Czechoslovakia, assignors to Lachema, Narodni Podnik, Brno, Czechoslovakia
No Drawing. Filed Aug. 20, 1968, Ser. No. 753,870
Int. Cl. C02b 5/02; C23g 1/28
U.S. Cl. 252—80              7 Claims

ABSTRACT OF THE DISCLOSURE

A composition for descaling and surface treatment, particularly useful for the treatment of metal surfaces, is produced by reacting at elevated pressure and temperature a mixture of sodium hydroxide, sodium and hydrogen, whereby the hydrogen is supplied in the form of a hydrogen-containing gas under pressure.

BACKGROUND OF THE INVENTION

The present invention relates to a method of producing a descaling composition including a large proportion of effective constituents for the purpose of descaling or otherwise treating the surface of metal bodies as well as of other materials.

The most advanced methods of descaling steel utilize hydrides and rely on the reducing characteristics of sodium hydride. The alkali metal hydride, preferably sodium hydride, is directly produced in the descaling bath by reacting sodium with hydrogen in a medium consisting of molten alkali metal, generally sodium hydroxide. It is a particular disadvantage of this method that it requires the manipulation of compressed hydrogen and metallic sodium in the metal-treating plant or arrangement. This causes substantial risk of explosion and, furthermore, the danger of uncontrollable side reactions which, obviously, might have an unfavorable effect.

Since, however, the metal descaling with the help of alkali metal hydrides, per se, possesses a number of very significant advantages, it is desirable to attempt methods for producing descaling bath compositions including hydrides as at least one of the effective constituents, which methods, however, would not be subject to the difficulties and dangers of the above-discussed methods.

Furthermore, it has been found in recent times that the presence of limited proportions of sodium oxide in the descaling bath is desirable.

It is therefore an object of the present invention to provide a descaling composition, and particularly a method of producing the same, which will not be subject to the above discussed difficulties and disadvantages, and which will give excellent descaling effects.

SUMMARY OF THE INVENTION

The present invention proposes to produce a descaling composition essentially consisting of a major proportion of an alkali metal hydroxide and significant minor proportions of alkali metal hydride and alkali metal oxide, by reacting at elevated pressure and temperature a mixture of alkali metal hydroxide, alkali metal and hydrogen.

Generally, the alkali metal of the above-mentioned compounds, as well as the free alkali metal, will be sodium, and the hydrogen will be supplied at the desired elevated pressure in the form of a hydrogen-containing gas, preferably at least technically pure hydrogen.

The reaction temperature generally will be between about 250 and 450° C. and preferably between about 350 and 430° C., and the reaction will be carried out at a gauge pressure of between about 1 and 100 atmospheres, and preferably between about 1 and 10 atmospheres.

Very good results are obtained by reacting 120 parts by weight of sodium hydroxide with between 2.7 and 70.5 and most preferably 34 and 46 parts by weight of sodium.

DESCRIPTION OF THE PREFERRED EMBODIMENTS

According to the present invention, the above-discussed difficulties are overcome by producing a molten descaling bath including a high proportion of effective constituents, by a reaction which will insure quick and reliable synthesis of the melt, in such a manner that the effective constituents of the melt, particularly the hydrides and oxides of alkali metals, preferably of sodium, are produced in a medium consisting of an excess of alkali metal hydroxide, preferably sodium hydroxide, by the mutual reaction of the alkali metal hydroxide, free alkali metal and hydrogen gas. The reaction is carried out generally at temperatures between 250 and 450° C., and preferably between about 350 and 430° C. at a hydrogen gas pressure of between 1 and 100 atmospheres above atmospheric pressure, preferably at a gauge pressure of between 1 and 10 atmospheres.

Within these ranges, the proportion of individual components of the finished melt, i.e., hydroxides, hydrides, oxides and carbonates of the alkali metal can be easily controlled as desired.

It may be noted that the melts produced in this manner generally contain alkali metal carbonate. However, this carbonate appears to be only a practically unavoidable side product which generally is present in an amount of about from 3 to 7 and most generally 5% of the total weight of the descaling composition. It originates from carbonate contained in the sodium hydroxide and possibly also from contact with the carbon dioxide-containing ambient atmosphere.

The following examples are given as illustrative only without, however, limiting the invention to the specific details of the examples.

Example I

The reaction is carried out in a pressure vessel equipped with conventional stirring equipment.

120 parts by weight sodium hydroxide and 34 parts by weight of sodium are introduced into the pressure vessel and hydrogen gas is then introduced at a gauge pressure of 4 atmospheres.

The reaction proceeds at a temperature of 380° C. After completion of the reaction and elimination of the hydrogen overpressure, the reaction mixture is removed from the pressure vessel and it is found that the thus-obtained composition comprises 15% sodium hydride, 15% sodium oxide, 5% sodium carbonate and 65% sodium hydroxide.

Example II 120 parts by weight of sodium hydroxide are introduced into the above-described pressure vessel and thereafter molten sodium is continuously introduced until the total amount of introduced sodium equals 34 parts by weight. The reaction proceeds at a temperature of 400° C. and at a gauge pressure of 10 atmospheres. The reaction product is then removed from the pressure vessel and found to consist of 18% sodium hydride, 4% sodium oxide, 5% sodium carbonate and 73% sodium hydroxide.

Example III 120 parts by weight sodium hydroxide are introduced into the above-described pressure vessel and then 46 parts by weight of sodium are added thereto. The reaction is then carried out with introduction of hydrogen gas at a gauge pressure of 50 atmospheres and at a temperature of 400° C.

After completion of the reaction and elimination of the hydrogen overpressure, the reaction mixture is removed from the pressure vessel and found to contain 25% sodium hydride, 1% sodium oxide, 5% sodium carbonate and 69% sodium hydroxide.

Example IV 120 parts by weight of sodium hydroxide are introduced into the above-described pressure vessel and thereafter 46 parts by weight of sodium are added. The reaction proceeds with introduction of hydrogen gas at a gauge pressure of 90 atmospheres, at a temperature of 430° C.

After completion of the reaction and elimination of the overpressure, the reaction mixture is removed from the pressure vessel and found to contain 27% sodium hydroxide, 0.1% sodium oxide, 5% sodium carbonate and 67.9% sodium hydroxide.

The thus-obtained compositions may be used for a wider range of purposes than the conventional hydrides-containing descaling compositions and may be used with advantage in the metallurgical and chemical industries, as well as in the machine-building industry.

Table I summarizes the above and additional examples.

Example 6

There were introduced into a pressure vessel similar to that described in Example 5, 34 parts by weight of molten sodium at a temperature of 350° C. Hydrogen was thereafter introduced at a pressure of 4 atmospheres gauge. The reaction proceeded at a temperature of 350° C. Following completion of the reaction 120 parts by weight of molten sodium hydroxide were introduced. The reaction product consisted of 19% NaH, 1% $Na_2O$, 7% $Na_2CO_3$ and 73% NaOH.

Example 7

The procedure of Example 2 was followed, i.e., the same reactants were introduced into the pressure vessel. The reaction proceeded at a temperature of 450° C. an an overpressure of 10 atmospheres gauge.

The reaction product consisted of 18% NaH, 5% $Na_2O$, 4% $Na_2CO_3$ and 73% NaOH.

Example 8

Example 2 was again repeated. The reaction was conducted at a temperature of 400° C. and an overpressure of 1 atmosphere gauge.

The reaction product consisted of 16% NaH, 10% $Na_2O$, 3% $Na_2CO_3$ and 71% NaOH.

TABLE I

| Example | Reaction mixture | | | | Reaction product (percent by weight) | | | |
|---|---|---|---|---|---|---|---|---|
| | Parts by weight | | pressure $H_2$, gauge | Reaction temperature, ° C. | NaH | $Na_2O$ | NaOH | $Na_2CO_3$ |
| | NaOH | Na | | | | | | |
| 1 | 120 | 34 | 4 | 380 | 15 | 15 | 65 | 5 |
| 2 | 120 | 34 | 10 | 400 | 18 | 4 | 73 | 5 |
| 3 | 120 | 46 | 50 | 400 | 25 | 1 | 69 | 5 |
| 4 | 120 | 46 | 90 | 430 | 27 | 0.1 | 67.9 | 5 |
| 5 | 120 | 34 | 4 | 250 | 19 | 1 | 77 | 3 |
| 6 | 120 | 34 | 4 | 350 | 19 | 1 | 73 | 7 |
| 7 | 120 | 34 | 10 | 450 | 18 | 5 | 73 | 4 |
| 8 | 120 | 34 | 1 | 400 | 16 | 10 | 71 | 3 |
| 9 | 120 | 34 | 7 | 400 | 17 | 8 | 71 | 4 |

Generally, the proportions of the starting material will be within the ranges indicated in Table II.

TABLE II.—REACTION MIXTURE

| | Maximum | Preferred | Minimum |
|---|---|---|---|
| NaOH-Na (percent by weight) | 100 | 100 | 100 |
| NaOH (percent by weight) | 63 | 78 | 97.8 |
| Na (percent by weight) | 37 | 22 | 2.2 |
| $H_2$ (gauge pressure in atmospheres) | 100 | 1–10 | 1 |
| Reaction temperature (° C.) | 450 | 350–430 | 250 |

The reaction product obtained in accordance with the present invention preferably may have a composition within the ranges indicated in Table III.

TABLE III.—REACTION PRODUCT

| | Percent by weight | | |
|---|---|---|---|
| | Maximum | Preferred | Minimum |
| NaH | 37.8 | 17.8 | 2 |
| $Na_2O$ | 1 | 8.4 | 1 |
| NaOH | 58.2 | 68.6 | 94 |
| $Na_2CO_3$ | 3 | 5.2 | 3 |

Example 5

34 parts by weight of molten sodium at a temperature of 250° C. were introduced into a pressure vessel equipped with a stirrer. Hydrogen gas was then introduced at a gauge pressure of 4 atmospheres. The reaction proceeded at a temperature of 250° C. When the hydrogen overpressure had been reduced, the reaction of the sodium with the hydrogen was completed by introduction of 120 parts by weight of molten sodium hydroxide, which served to dissolve the sodium.

The reaction product consisted of 19% NaH, 1% $Na_2O$, 3% $Na_2CO_3$ and 77% NaOH.

Example 9

Example 2 was again repeated. The reaction was carried out at a temperature of 400° C. and an overpressure of 7 atmospheres.

The reaction product consisted of 17% NaH, 8% $Na_2O$, 4% $Na_2CO_3$ and 71% NaOH.

Example 10

Example 2 was repeated employing in place of the sodium hydroxide and sodium, lithium hydroxide and lithium respectively.

The same results were obtained but in place of the sodium hydride, sodium carbonate, sodium oxide and sodium hydroxide, the corresponding lithium compounds were found in the reaction product.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A batch method of producing a descaling composition which consists essentially of an alkali metal hydroxide and significant minor proportions of an alkali metal hydride and an alkali metal oxide, comprising the steps of charging a pressure vessel with a mixture of alkali metal hydroxide and alkali metal; raising the temperature of said pressure vessel; introducing hydrogen under pressure to react with some of said alkali metal hydroxide and with said alkali metal; and removing said alkali metal oxide, and said alkali metal hydride together with the remaining alkali metal hydroxide, thereby readying said vessel for repetition of said process.

2. A method as defined in claim 1 wherein said alkali metal is sodium.

3. A method as defined in claim 2, wherein said reacting is carried out in a pressure vessel and said elevated pressure is maintained by introducing a free hydrogen-containing gas under pressure into said reaction vessel.

4. A method as defined in claim 3, wherein said free hydrogen-containing gas is at least technically pure hydrogen.

5. A method as defined in claim 3, wherein said elevated temperature is between about 250 and 450° C., said elevated pressure is between about 1 and 100 atmospheres gauge pressure, and 120 parts by weight NaOH is reacted with between 2.7 and 70.5 parts by weight of sodium.

6. A method as defined in claim 5, wherein said elevated temperature is between 350 and 430° C. and said elevated pressure is between 1 and 10 atmospheres gauge pressure.

7. A method as defined in claim 6, wherein 120 parts by weight of NaOH are reacted with between 34 and 46 parts by weight of sodium.

References Cited
UNITED STATES PATENTS

| | | | |
|---|---|---|---|
| 2,377,876 | 6/1945 | Gilbert | 134—2 |
| 2,717,845 | 9/1955 | Carter | 134—2 |
| 2,796,366 | 6/1957 | Carter | 134—2 |
| 2,891,881 | 6/1959 | Jaffe | 134—2 |

JOHN T. GOOLKASIAN, Primary Examiner

M. E. McCAMISH, Assistant Examiner

U.S. Cl. X.R.

23—184; 134—2; 204—141; 252—175